US009478143B1

(12) United States Patent
Bowen

(10) Patent No.: US 9,478,143 B1
(45) Date of Patent: Oct. 25, 2016

(54) PROVIDING ASSISTANCE TO READ ELECTRONIC BOOKS

(75) Inventor: James Samuel Bowen, Cupertino, CA (US)

(73) Assignee: Amazon Technologies, Inc., Seattle, WA (US)

(*) Notice: Subject to any disclaimer, the term of this patent is extended or adjusted under 35 U.S.C. 154(b) by 425 days.

(21) Appl. No.: 13/072,401

(22) Filed: Mar. 25, 2011

(51) Int. Cl.
G06F 3/01 (2006.01)
G09B 17/00 (2006.01)
G09B 5/00 (2006.01)
G09B 5/06 (2006.01)

(52) U.S. Cl.
CPC ............... G09B 5/00 (2013.01); G09B 5/062 (2013.01)

(58) Field of Classification Search
USPC .................................................. 434/178, 317
See application file for complete search history.

(56) References Cited

U.S. PATENT DOCUMENTS 5,731,805 A * 3/1998 Tognazzini et al. .......... 345/156
6,305,942 B1 * 10/2001 Block et al. .................. 434/156
6,781,609 B1 * 8/2004 Barker et al. ................. 715/760
2005/0086056 A1 * 4/2005 Yoda et al. .................... 704/246
2006/0214911 A1 * 9/2006 Miller ............................ 345/157
2006/0256083 A1 * 11/2006 Rosenberg .................... 345/156
2008/0166693 A1 * 7/2008 Gifford et al. ................ 434/322

* cited by examiner

Primary Examiner — Sam Yao
Assistant Examiner — Evan Page
(74) Attorney, Agent, or Firm — Lee & Hayes, PLLC

(57) ABSTRACT

Architectures and techniques are described to provide assistance to read electronic books. In particular, a computing device may receive input from an individual while the individual is reading an electronic book, such as voice input, gaze tracking input, touch screen input, and so on. Based on the input gathered while the individual reads the electronic book, the computing device may determine a particular portion of the electronic book, such as one or more words of the electronic book, that the individual is reading. The computing device may also utilize the input gathered while the individual reads the electronic book to determine whether the individual needs assistance in reading one or more words of the electronic book, such as assistance in pronouncing the one or more words. The computing device may then provide assistance to the individual to read the one or more words.

31 Claims, 8 Drawing Sheets

PROVIDING ASSISTANCE TO READ ELECTRONIC BOOKS

BACKGROUND

Learning to read can be an exciting and challenging process. Many aids have been developed to help individuals learn to read. For example, educational videos and electronic games may be used to familiarize beginning readers with a variety of words and also sounds associated with certain letters and letter combinations.

Additionally, electronic devices may provide readers with assistance to read books. In some instances, electronic devices may allow a reader to select words of a book, and audio recordings of the words are played back to the reader by the electronic devices. In other cases, electronic devices may read stories to a user, while highlighting the words as they are read. However, these reading devices are limited in the techniques used to determine when a reader needs assistance and in the types of assistance that can be provided to readers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
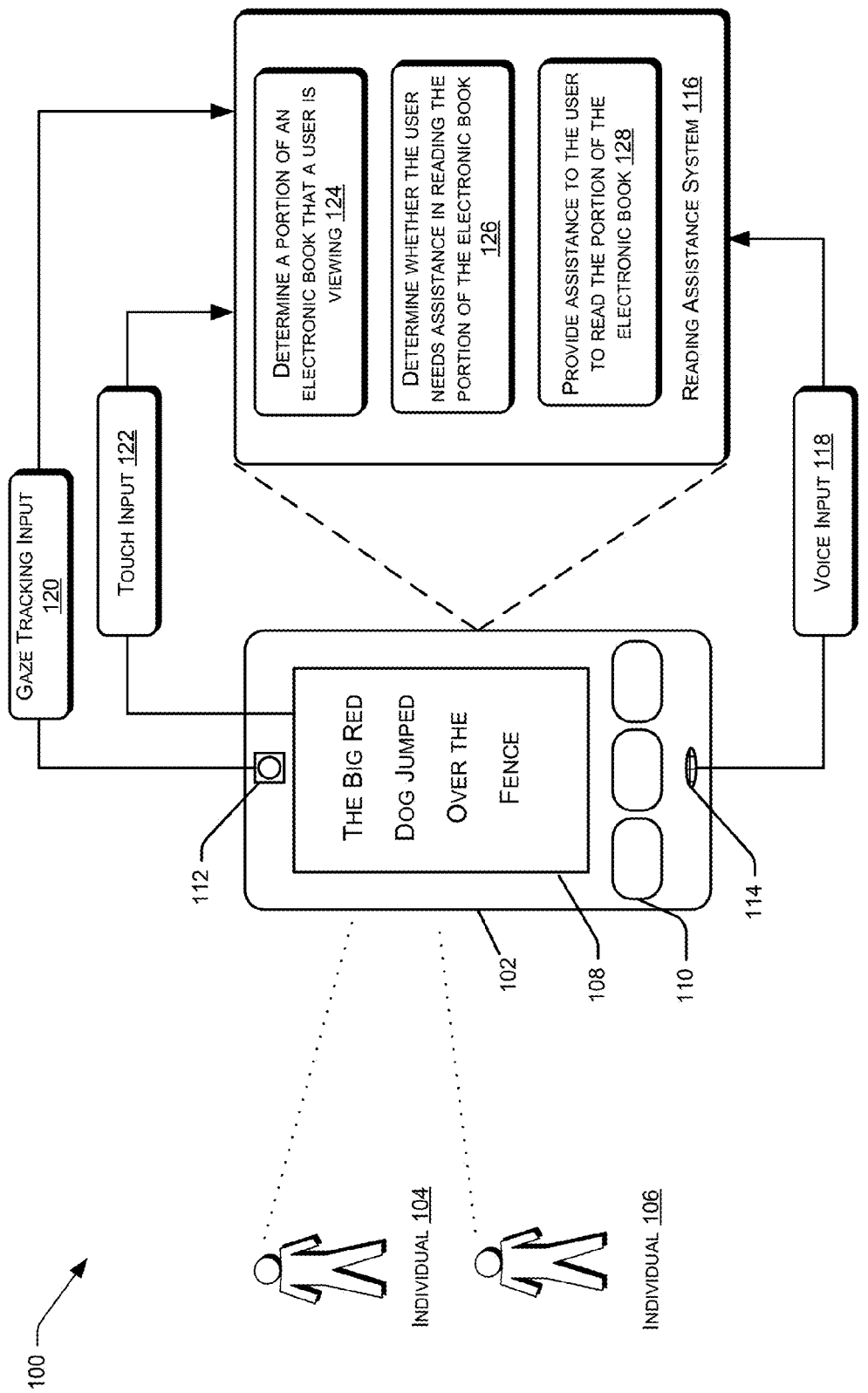
FIG. 1 illustrates a framework to provide assistance to individuals reading electronic books.

This disclosure describes architectures and techniques to provide assistance to read electronic books. In particular implementations, a computing device may receive input from an individual while the individual is reading an electronic book. For example, the computing device may capture voice input from an individual as the individual reads the electronic book aloud. Additionally, the computing device may capture gaze tracking input indicating portions of the electronic book that the individual is viewing. Further, the computing device may receive touch screen input when the individual slides a finger, stylus, or other input device across a display as the individual is reading words shown on the display.

Based on the input gathered as the individual reads the electronic book, the computing device may determine a particular portion of the electronic book, such as one or more words of the electronic book, that the individual is reading. In one example, the computing device may determine one or more words of a particular sentence of the electronic book that the individual has read and one or more words that are subsequently arranged in the sentence, that is, the one or more words that are to be read next by the individual. In some instances, the computing device may assist the individual in reading the electronic book by changing the appearance of words that have been read, such as by showing words that have been read in a lighter color than words that have not been read. Additionally, the computing device may also provide assistance to individuals reading electronic books by changing the appearance of words that are to be read next by the individual, such as by highlighting these words. These techniques may help an individual keep track of the words that need to be read and minimize skipping words or repeating words that have already been read.

The computing device may also utilize the input gathered as the individual reads the electronic book to determine whether the individual needs assistance in reading one or more words of the electronic book, such as assistance in pronouncing the one or more words. In some situations, the computing device may determine that an individual has paused while reading an electronic book. Based on the length of the pause, the computing device may determine that the individual needs assistance in reading one or more words of the electronic book. Further, the computing device may also determine that the individual needs assistance in reading one or more words of an electronic book upon receiving voice input from the individual indicating that the individual is having trouble pronouncing the one or more words.

When the computing device determines that an individual needs assistance in reading one or more words of an electronic book, the computing device may provide assistance to the individual to read the one or more words. To illustrate, the computing device may play an audio recording of the one or more words. Additionally, the computing device may show a phonetic spelling of each of the one or more words to assist the individual in reading the one or more words. Further, the computing device may highlight or call attention to pictures of the electronic book that correspond to the one or more words. For example, if the individual is having trouble reading the word "lion," the computing device may change the appearance of a picture of a lion shown on the display, such as by increasing the brightness of the picture of the lion or otherwise highlighting the picture of the lion.

In certain instances, the input gathered by the computing device while the individual reads the electronic book may indicate that the individual has skipped one or more words. In these instances, the computing device may change the appearance of one or more words that the individual has skipped. Further, the computing device may determine that the individual is no longer looking at words of the electronic book and is either looking at pictures of the electronic book or is otherwise distracted by something outside of the electronic book. In these situations, the computing device may highlight, flash, or otherwise change the appearance of the next word to be read by the individual to call the individual's attention back to reading the words of the electronic book. Audio prompts may also be provided by the computing device to bring the individual's attention back to reading the electronic book or to alert the individual that words have been skipped.

When multiple individuals are involved in reading the electronic book, such as a parent reading the electronic book with a child or a teacher helping a student to read the electronic book, the computing device may identify the individual that is actually reading the electronic book aloud (i.e. the child or the student). Specifically, the computing device may utilize facial dimensions, face recognition techniques, voice characteristics, and so on, to identify the individual reading the electronic book. In this way, the computing device can utilize gaze tracking and/or voice input from the particular individual reading the electronic book to determine the portion of the electronic book that is being read and to determine whether assistance is needed to read the portion of the electronic book. Thus, these techniques may exclude input from teachers, parents, and other individuals that may be proximate to the computing device, but are not reading the electronic book, in order to minimize any errors in determining when to provide assistance to an individual reading the electronic book.

Providing assistance to an individual reading an electronic book as described herein simulates an experience that is similar to the assistance that a parent or teacher may provide to an individual learning to read. In particular, a computing device operating according to the techniques described herein takes into account an individual's actual progress in reading words of an electronic book and automatically provides assistance without a specific input for assistance by the individual. The computing device may also provide reading assistance in a variety of formats, which may be used to supplement assistance provided by parents or teachers and enhance the experience of an individual learning to read.

Some implementations of the architecture and techniques described herein are described in the context of electronic books. The terms "electronic book" and/or "eBook," as used herein, may include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc.

Example Framework

FIG. 1 illustrates a framework 100 to provide assistance to individuals reading electronic books. The framework 100 includes a computing device 102 that provides electronic books to be read by users of the computing device 102. In an illustrative example, the users of the computing device may include an individual 104, such as a teacher or parent, who is helping an individual 106, such as a student or child, learn to read. In some cases, the computing device 102 may include a laptop computer, a desktop computer, a smart phone, an electronic reader device, a mobile handset, a personal digital assistant (PDA), a portable navigation device, a portable gaming device, a tablet computer, a watch, a portable media player, another client device, and the like.

The computing device 102 includes a display 108 that is utilized to display electronic content, such as words, illustrations, images, and so forth of electronic books. The computing device 102 also includes a number of input devices 110 that are operable to type characters, make selections, etc. Further, the computing device 102 includes one or more cameras represented by camera 112 and one or more microphones represented by microphone 114.

The camera 112 and the microphone 114 may capture input from one or more of the individuals 104, 106, as an electronic book is being read via the computing device 102. Additionally, the display 108 may include a touch screen that is operable to receive touch input from the individuals 104, 106 as an electronic book is being read via the computing device 102. Input captured by the computing device 102 from the individuals 104, 106 may be utilized to determine whether the individual 106, who is learning to read, needs assistance in reading an electronic book. In the particular implementation shown in FIG. 1, the computing device 102 includes a reading assistance system 116 to determine whether the individual 106 needs assistance to read an electronic book and provides the corresponding assistance to the individual 106.

In an illustrative implementation, the reading assistance system 116 receives input from input devices of the computing device 102, such as the camera 112, the microphone 114, and/or a touch screen of the display 108. For example, the reading assistance system 116 may receive voice input 118 from the microphone 114. The voice input 118 may include the voice of the individual 106 reading words of an electronic book aloud. The reading assistance system 116 may also receive gaze tracking input 120 from the camera 112. The gaze tracking input 120 may include movement of the eyes and/or face of the individual 106 while reading an electronic book. Further, the reading assistance system 116 may receive touch input 122 via a touch screen portion of the display 108. The touch input 122 may include a touch at a particular spot on the display 108, a sliding motion of a finger across the display 108, and the like.

At 124, the reading assistance system 116 may utilize the voice input 118, the gaze tracking input 120, the touch input 122, or combinations thereof, to determine a portion of an electronic book that a user of the computing device 102 is viewing. In certain situations, the reading assistance system 116 may utilize the voice input 118 to identify words of an electronic book that the individual 106 is reading. By comparing words of the voice input 118 to the actual words of an electronic book, the reading assistance system 116 can track the progress the individual 106 through the electronic book. Thus, the reading assistance system 116 can identify words of an electronic book that have been read and words of an electronic book that will be read next by the individual 106. In this way, the reading assistance system 116 can determine a portion of an electronic book that the individual 106 is viewing.

Furthermore, the camera 112 may capture the movement of the eyes of the individual 106 as they move across electronic content shown on the display 108. Accordingly, based on the movement of the eyes of the individual 106, the reading assistance system 116 can determine the portion of an electronic book that the individual 106 is viewing at a particular time. The reading assistance system 116 may also utilize the touch input 122 indicating a location of a finger or stylus utilized by the individual 106 to determine the portion of an electronic book that is being viewed by the individual 106. Additionally, the reading assistance system 116 may utilize some combination of the voice input 118, the gaze tracking input 120, and the touch input 122 to determine the portion of an electronic book that the individual 106 is viewing. In particular instances, the reading assistance system 116 may apply one or more weightings to the voice input 118, the gaze tracking input 120, and the touch input 122 to determine the portion of an electronic book that the individual 106 is viewing. In an illustrative implementation, the reading assistance system 116 may utilize the voice input 118, the gaze tracking input 120, the touch input 122, or a combination thereof, to determine that the individual 106 has read the words "The big red dog" shown on the display 108 and that the individual 106 is about to read the word "jumped."

At 126, the reading assistance system 116 determines whether the individual 106 needs assistance in reading a portion of an electronic book. In some cases, the reading assistance system 116 may utilize the voice input 118, the gaze tracking input 120, and/or the touch input 122 and measure a pause taken by the individual 106 while reading the words shown on the display 104. When the pause meets a threshold length of time, the reading assistance system 116 may determine that the individual 106 needs assistance in reading particular words of the electronic book. In addition, the reading assistance system 116 may utilize the voice input 118 and determine that the individual 106 is mispronouncing a word shown on the display or making a number of unsuccessful attempts are properly reading the word. When the reading assistance system 116 determines that the individual 106 has mispronounced a particular word or words shown on the display 108 for a certain period of time or a specified number of times, the reading assistance system 116 may determine that the individual 106 needs assistance in reading the electronic book. Continuing with the illustrative example from above utilizing the words shown on the display 104, the reading assistance system 116 may determine that the individual 106 is having difficulty reading the word "jumped."

At 128, the reading assistance system 116 may provide assistance to the individual 106 to read the portion of the electronic book that the individual 106 is viewing. To illustrate, the reading assistance system 116 may cause an audio recording to be played of one or more words that the individual 106 is having trouble reading. Once again, continuing the example from above, the reading assistance system 116 may cause a recording of the word "jumped" to be played through speakers (not shown) of the computing device 102. In another example, the reading assistance system 116 may show a phonetic spelling of the words that the individual 106 is having trouble reading. In an illustrative example, the reading assistance system 116 may cause a phonetic spelling of the word "jumped" to appear on the display 108 when determining that the individual 106 needs assistance to read the word "jumped." The reading assistance system 116 may also provide assistance to the individual 106 when words are skipped while reading an electronic book or the gaze of the individual 106 is not focused on the words shown on the display 108, but on another portion of the electronic book, such as images corresponding to the words of the display, or on other objects outside of the computing device 102.

By utilizing input received from input devices of the computing device 102, the reading assistance system 116 can automatically provide assistance to the individual 106 to read words of an electronic book without an explicit prompt for help by the individual 106. In this way, the computing device 102 can provide assistance to the individual 106 in reading an electronic book that is similar to the assistance provided by a parent or teacher in that the computing device 102 may rely on similar clues, such as pauses in reading and/or mispronunciations, to determine when to provide assistance to the individual 106 while reading an electronic book. Further, the computing device 102 may provide assistance to the individual 106 in a number of forms, such as audio assistance and visual assistance. Providing assistance to the individual 106 in a variety of forms may enhance the learning experience of the individual 106 by directing assistance to both the auditory and visual senses. In some instances, the reading assistance system 116 can provide assistance that is best received by the individual 106. For example, auditory learners may receive audible assistance, while visual learners may receive visual assistance. Thus, the reading assistance system 116 of the computing device 102 may serve at least to supplement assistance provided by parents or teachers in teaching students or children to read and, in many cases, the reading assistance system 116 may enhance the learning experience of students when learning to read.

Example System

Figure 2:
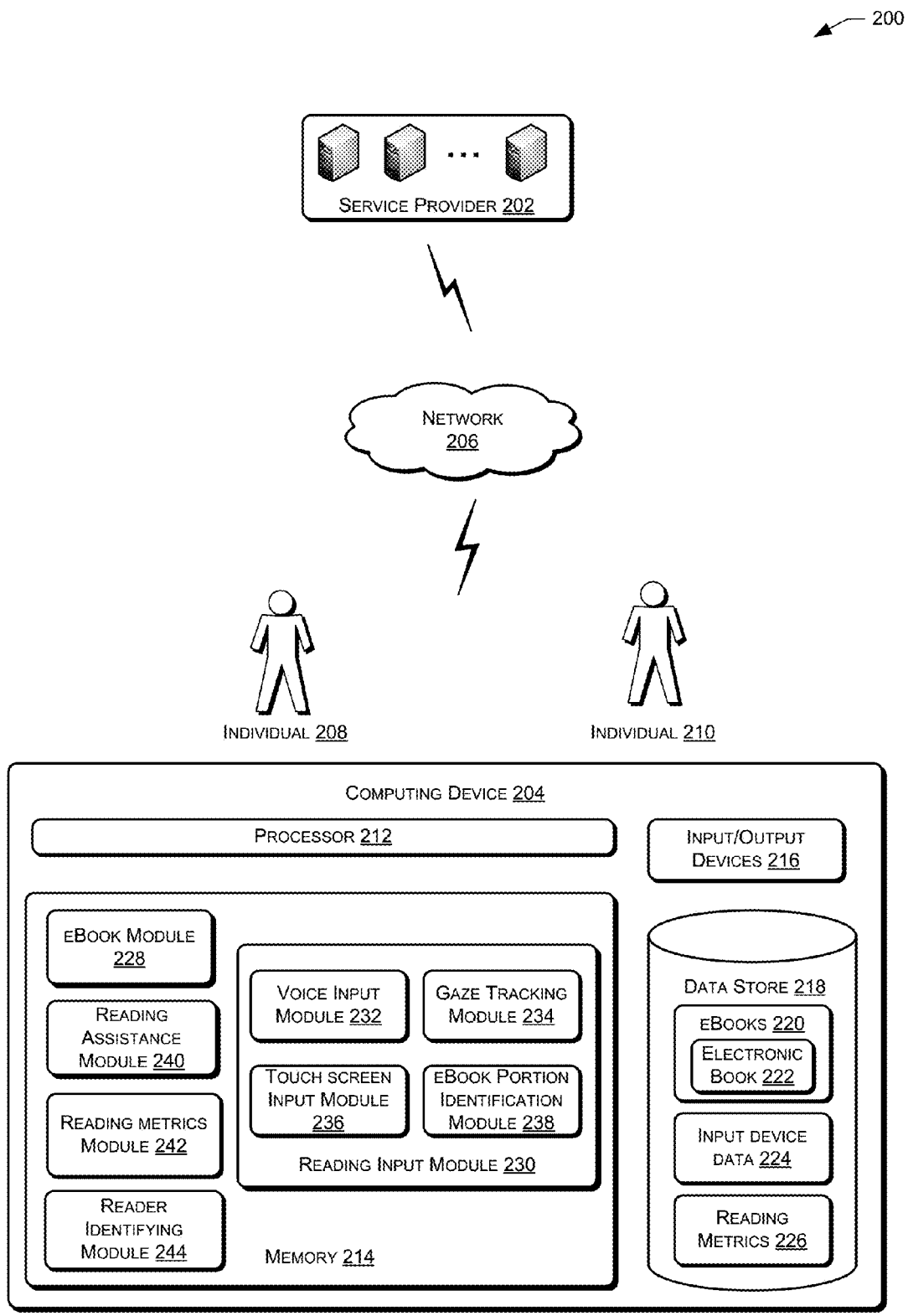
FIG. 2 illustrates components of a system to provide assistance to individuals reading electronic books.

FIG. 2 illustrates components of a system 200 to provide assistance to individuals reading electronic books. The system 200 includes a service provider 202 that may comprise a single server, a cluster of servers, a server farm or data center, and so forth, although other server architectures (e.g., a mainframe architecture) may also be used. The system 200 also includes a computing device 204 that may communicate with the service provider 202 via a network 206. The network 206 includes any one or combination of multiple different types of wired and wireless networks, such as the Internet, cable networks, satellite networks, wide area wireless communication networks, wireless local area networks, and public switched telephone networks (PSTN). The computing device 204 may provide electronic books to be read by one or more users of the computing device 204. The one or more users may include an individual 208 and an individual 210. In some cases, the individual 208 may represent a parent or teacher that is helping a student or child, such as the individual 210, to read.

The computing device 204 includes one or more processors indicated by the processor 212. The computing device 204 also includes memory 214 that is accessible by the processor 212. The memory 214 is an example of computer readable storage media and may include volatile memory, nonvolatile memory, removable memory, non-removable memory, or a combination thereof. For example, the memory 214 may include, but is not limited to, RAM, ROM, EEPROM, flash memory, one or more hard disks, solid state drives, optical memory (e.g. CD, DVD), or other non-transient memory technologies. The memory 214 may store a number of modules including computer-readable instructions executable by the processor 212 to provide assistance to individuals, such as the individual 210, to read electronic books. The computing device 204 also includes input/output devices 216. The input/output devices 216 may include a keyboard, a pointer device, (e.g. a mouse or a stylus), a touch screen, one or more cameras, one or more microphones, a display, speakers, and so forth.

The computing device 204 also includes a data store 218 that may include, but is not limited to, RAM, ROM, EEPROM, flash memory, one or more hard disks, solid state drives, optical memory (e.g. CD, DVD), or other non-transient memory technologies. The data store 218 may store one or more electronic books 220, such as an electronic book 222. The electronic books 220 may be obtained from the service provider 202 and may include text content, image content, video content, audio content, or combinations thereof.

The data store 218 may also include input device data 224 gathered from input devices of the computing device 204, such as a camera, a microphone, and/or a touch screen. In particular, the input device data 224 may include audio data of the individual 210 reading the electronic books 220, gaze tracking data indicating the movement of the eyes of the individual 210 while reading the electronic books 220, touch data indicating contact made by the individual, either directly with a finger or indirectly with a stylus or pen, while reading the electronic books 220, or combinations thereof.

In addition, the data store 218 may store reading metrics 226. The reading metrics 226 may be derived from input received from the individual 210 while the individual 210 is reading the electronic books 220. For example, the reading metrics 226 may include speed of reading, words read by the individual 210, new words read by the individual 210, reading level of words read by the individual 210, reading ability of the individual 210, and the like.

The memory 214 includes an electronic book module 228 that is executable by the processor 212 to obtain the electronic books 220 from one or more sources, such as the service provider 202. In some instances, the electronic book module 228 may request to download a particular electronic book, such as the electronic book 222, from the service provider 202 and store the electronic book 222 in the data store 218. In other instances, the electronic book module 228 may obtain a portion of the electronic book 222 from the service provider 202. To illustrate, the electronic book module 228 may obtain one or more pages of the electronic book 222 from the service provider 202, where the one or more pages of the electronic book 222 include a page of the electronic book 222 that the individual 210 is currently reading, one or more pages preceding the page that is currently being read, one or more pages subsequent to the page that is currently being read, or a combination thereof.

The electronic book module 228 may also be executable by the processor 212 to render content of the electronic books 220. For example, the electronic book module 228 may render text content, image content, video content, or combinations thereof, of the electronic book 222 via a display of the computing device 204. The electronic book module 228 may also provide audio associated with the electronic books 220 via speakers of the computing device 204.

In addition, the memory includes a reading input module 230 that is executable by the processor 212 to determine a portion of an electronic book, such as the electronic book 222, that is being viewed by an individual, such as the individual 210, reading the electronic book 222. The reading input module 230 may utilize input received from one or more input devices 216 of the computing device 204 to determine the portion of the electronic book 222 that is being viewed by the individual 210. By determining the portion of the electronic book 222 that the individual 210 is viewing, the reading input module 230 may also determine particular words of the electronic book 222 that the individual 210 is reading.

Specifically, the reading input module 230 includes a voice input module 232 that is executable by the processor 212 to receive voice input via one or more microphones of the computing device 204. For example, as the individual 210 reads the electronic book 222 aloud, the voice input module 232 may capture the words of the electronic book 222 being read by the individual 210. The voice input module 232 may also capture speech produced by other individuals proximate to the computing device 204, such as the individual 208, and/or other sounds audible near the computing device 204. The input captured by the voice input module 232 may be stored in the data store 218 as at least a portion of the input device data 224.

The reading input module 230 also includes a gaze tracking module 234 that is executable by the processor 212 to follow a gaze of the individual 210 as the individual 210 reads the electronic book 222. To illustrate, the gaze tracking module 234 may capture eye movements of the individual 210 as the individual 210 scans the display of the computing device 204 to read words of the electronic book 222. The gaze tracking module 234 may also capture eye movements of other individuals, such as the individual 208, that are also viewing content provided via the computing device 204. The data collected by the gaze tracking module 234 may also be stored as at least a portion of the input device data 224.

Further, the reading input module 230 includes a touch screen input module 236 that is executable by the processor 212 to receive input from a touch screen of the computing device 204. The touch screen input may include particular points of the display of the computing device 204 that are touched by the individual 210 as the words of the electronic book 222 are being read. In some cases, the individual 210 may select one or more specific words of the electronic book 222 by using a finger of the individual 210, a stylus, pen, another pointing device, and so on. In other instances, touch screen input may include contact made by the individual 210 on the display of the computing device 204 by sliding a finger or other pointing device along the display as the individual 210 reads the words of the electronic book 222. The data captured by the touch screen input module 236 may be stored in the data store 218 as at least a portion of the input device data 224.

Further, the reading input module 230 includes an electronic book portion identification module 238 that is executable by the processor 212 to determine a portion of the electronic book 222 that is being read by the individual 210. In certain situations, the electronic book portion identification module 238 may utilize the voice input, the gaze tracking input, the touch screen input, or a combination thereof to determine a portion of the electronic book 222 that the individual 210 is viewing at a particular time. In some implementations, the electronic book portion identification module 238 may determine words of the electronic book 222 that have been read by the individual 210 based on voice input captured from the individual 210 as the electronic book 222 is being read aloud by the individual 210. The electronic book portion identification module 238 may also determine the next words of the electronic book 222 that are to be read by the individual 210 based on the voice input captured from the individual 210. By analyzing the words read by the individual 210, the electronic book portion identification module 238 may determine a portion of the electronic book 222 that the individual 210 is viewing at a particular time.

In addition, the electronic book portion identification module 238 may utilize gaze tracking input to identify a portion of the electronic book 222 that the individual 210 is currently viewing. For example, the electronic book portion identification module 238 may analyze the eye movements of the individual 210 captured via a camera of the computing device 204 to determine that the individual 210 is viewing a particular portion of the electronic book 222. The electronic book portion identification module 238 may also utilize touch screen input to determine a portion of the electronic book 222 that the individual 210 is viewing. In a particular implementation, the electronic book portion identification module 238 may determine a current location of a touch screen input made by the individual 210 or a most recent input on a touch screen of the computing device 204 to determine a portion of the electronic book 222 that the individual 210 is viewing.

In some cases, the electronic book portion identification module 238 may selectively analyze one or more of the inputs received from the individual 210 to determine the portion of the electronic book 222 being viewed by the individual 210. In a particular example, the electronic book portion identification module 238 may utilize only voice input or only gaze tracking input to determine a portion of the electronic book 222 being viewed by the individual 210. In certain situations, the input utilized by the electronic book portion identification module 238 may depend on the input devices of the computing device 204. To illustrate, if the computing device 204 includes a microphone, but not a camera, the electronic book portion identification module 238 may utilize only voice input to determine the portion of the electronic book 222 that is being viewed by the individual 210. In another example, the electronic book portion identification module 238 may utilize a combination of the voice input, gaze tracking input, and touch screen input to determine the portion of the electronic book 222 being viewed by the individual 210. In some instances, the inputs utilized by the electronic book portion identification module 238 may be assigned weightings that are used to determine the portion of the electronic book 222 that the individual 210 is viewing. In an illustrative example, the electronic book portion identification module 238 may consider voice input received from the individual 210 to be more important in determining the portion of the electronic book 222 being viewed by the individual 210 and, thus, apply a heavier weighting to the voice input.

The memory 214 also includes a reading assistance module 240 that is executable by the processor 212 to determine whether a user of the computing device 204 reading an electronic book, such as the individual 210 reading the electronic book 222, needs assistance to read one or more words of the electronic book 222. In some cases, the reading assistance module 240 may provide reading assistance to the individual 210 by altering the appearance of words of the electronic book 222 that have been read by the individual 210, such as by presenting the words in a lighter color, and presenting words that have not been read by the individual 210 in a darker color. Furthermore, the reading assistance module 240 may alter the appearance of at least one word of the electronic book 222 that is to be read next by the individual 210 by changing a color, font, or style of the at least one next word, highlighting the at least one next word, increasing a font size of the at least one next word, or combinations thereof.

In certain scenarios, the reading assistance module 240 may provide reading assistance to the individual 210 by automatically turning pages of the electronic book 222. To illustrate, the reading assistance module 240 may receive an indication from the electronic book portion identification module 238 based, at least partly, on input received via the reading input module 230 that the individual 210 has read the last one or more words on a page of the electronic book 222. In these cases, the reading assistance module 240 may turn the current page of the electronic book and provide the content of the next page of the electronic book 222 to the display of the computing device 204.

In particular implementations, the reading assistance module 240 may also utilize input gathered by the reading input module 230 to determine whether the individual 210 needs assistance to read a portion of the electronic book 222. To illustrate, the reading assistance module 240 may determine whether the individual 210 pauses while reading the electronic book 222. When a pause taken by the individual 210 while reading the electronic book 222 meets a threshold amount of time, the reading assistance module 240 may determine that the individual 210 needs assistance in reading one or more words of the electronic book 222 that the individual 210 is attempting to read.

Additionally, the reading assistance module 240 may utilize voice input from the individual 210 to determine whether the individual 210 has mispronounced one or more words of the electronic book 222. In some cases, the reading assistance module 240 may determine whether the individual 210 has made a specified number of attempts to pronounce one or more words of the electronic book 222, but has not achieved a correct pronunciation. When the individual 210 has mispronounced one or more words of the electronic book 222 or has failed to correctly pronounce the one or more words a specified number of times, the reading assistance module 240 may determine that the individual 210 needs assistance in reading the one or more words.

In certain situations, the reading assistance module 240 may take into account reading ability of the individual 210 and/or the reading level of the one or more words that the individual 210 needs assistance with when determining when to provide reading assistance to the individual 210. For example, the threshold length of a pause utilized by the reading assistance module 240 to determine when the individual 210 needs reading assistance may depend on the reading ability of the individual 210 and/or a reading level associated with the one or more words. To illustrate, when the reading ability of the individual 210 is on the lower end of a scale (e.g. first grade or second grade) and the reading level of the one or more words is relatively high (e.g. seventh grade or eighth grade), then the threshold length of the pause may be for a longer duration than when the reading level of the one or more words is relatively low. Additionally, the number of mispronunciations made by the individual 210 before the reading assistance module 240 provides reading assistance may also depend on reading ability of the individual 210 and/or the reading level of the one or more words of the electronic book 222 that the individual 210 is having problems reading. In an illustrative implementation, when the reading ability of the individual 210 is relatively high and the reading level of the one or more words is relatively low, then the reading assistance module 240 may allow only one mispronunciation of the one or more words before providing reading assistance.

Once the reading assistance module 240 determines that the individual 210 needs assistance in reading one or more words of the electronic book 222, the reading assistance module 240 may also provide assistance to the individual 210 to read the one or more words. In some cases, the reading assistance module 240 determines the one or more for which to provide reading assistance based on the portion of the electronic book 222 that the individual 210 is viewing as determined by the electronic book portion identification module 238. Further, the reading assistance module 240 may determine the one or more words for which to provide reading assistance based on the attempted pronunciations of the one or more words by the individual 210 or pauses taken by the individual 210 while trying to read the one or more words.

The reading assistance provided to the individual 210 may take a number of forms. For example, the reading assistance module 240 may provide audible reading assistance to the individual 210 by playing an audio recording of one or more words of the electronic book 222 that the individual 210 needs assistance to read. In some cases, the recording may be played a number of times. Additionally, the reading assistance module 240 may provide audio recordings of different pronunciations of the one or more words, such as pronunciations of the one or more words as they would normally be read and also phonetic pronunciations of the one or more words. The reading assistance module 240 may also provide audio recordings of the one or more words in a plurality of languages or dialects and with one or more accents. The reading assistance module 240 may determine the pronunciations of the one or more words to provide to the individual 210 based on user preferences stored at the computing device 204, based on user preferences obtained from the service provider 202, based on a language, dialect, and/or accent that the individual 210 speaks with, and the like. In certain situations, the reading assistance module 240 may utilize the voice input of the individual 210 to determine a language, dialect, and/or accent spoken by the individual 210.

The reading assistance module 240 may also provide visual assistance to the individual 210 to read one or more words of the electronic book 222. In some situations, the reading assistance module 240 may highlight the one or more words and/or provide a visual aid including a phonetic spelling of the one or more words. Additionally, the reading assistance module 240 may provide a text box via a display of the computing device 204, where the text box may include a definition of one or more words that the individual 210 needs assistance in reading. For instance, the reading assistance module 240 may determine that the individual 210 has paused for a certain length of time while reading the electronic book 222 and automatically display the text box with the definition of the word that the individual 210 needs assistance in reading. In some cases, the text box may include a translation of a word in a second language and/or a spelling in the second language to assist the individual 210 in reading the electronic book 222. To illustrate, the electronic book 222 may be written in French and when the reading assistance module 240 determines that the individual 210 needs assistance in reading one or more words of the electronic book 222, the reading assistance module 240 may provide a text box with a translation of the one or more words in the native language of the individual 210, such as English. The text box may be provided by the reading assistance module 240 in addition to other forms of visual and/or audio reading assistance provided to the individual 210 and in some cases, the text box may be provided at the bottom of the display. The text box may be displayed for a predetermined amount of time and then fade from view unless selected by the individual 210.

The reading assistance module 240 may also change the appearance of pictures corresponding to the one or more words that the individual 210 needs help in reading. In particular implementations, the reading assistance module 240 may brighten the appearance of the pictures corresponding to the one or more words or otherwise highlight the pictures. In an illustrative example, when the individual 210 is having difficulty reading the word "horse," the reading assistance module 240 may highlight a picture of a horse shown in association with the word "horse" in the electronic book 222. The reading assistance module 240 may also obtain a picture of a horse and provide the picture to the individual 210 via a display of the computing device 204.

The reading assistance module 240 may also combine audio and visual forms of reading assistance. To illustrate, the reading assistance module 240 may provide a visual aid with a phonetic spelling of the one or more words of the electronic book 222 while providing an audio recording of a phonetic pronunciation of the one or more words. In some cases, the reading assistance module 240 may highlight the phonemes shown in the visual aid as an audio recording of the respective phonemes is played. When pictures of the one or more words are highlighted or provided to assist the individual 210 in reading the one or more words, the reading assistance module 240 may also provide sounds associated with the objects of the pictures, such as sounds made by a horse.

In particular implementations, the reading assistance module 240 may provide reading assistance to the individual 210 based on preferences of the individual 210. For example, the reading assistance module 240 may primarily provide audio reading assistance when the individual 210 has indicated a preference to receive auditory reading assistance. Additionally, the reading assistance module 240 may determine that the individual 210 is a visual learner and provide primarily visual and/or audio/visual reading assistance to the individual 210. In certain scenarios, the reading assistance module 240 may obtain data from the service provider 202 indicating a reading assistance preference or learning type associated with the individual 210. In other instances, the reading assistance module 240 may identify a learning type of the individual 210 or reading assistance preference based on input received from the individual 210 via the reading input module 230, such as voice input, gaze tracking input, touch input, or combinations thereof. In certain situations, the individual 210 may choose to turn off an option to provide reading assistance, indicate that reading assistance is provided for certain electronic books 220 or certain types of the electronic books 220, and so forth.

Furthermore, the reading assistance module 240 may provide assistance to the individual 210 when the individual 210 has skipped one or more words of the electronic book 222. In an illustrative implementation, the reading assistance module 240 may utilize input gathered by the reading input module 230 to determine that the individual 210 has skipped one or more words of the electronic book 222 by comparing the words being read aloud by the individual 210 to information indicating the actual words of the electronic book 222. When the words being read by the individual 210 do not match the actual words of the electronic book 222, the reading assistance module 240 may determine that the individual 210 has skipped one or more words of the electronic book 222 and provide a visual and/or auditory notification that the one or more words have been skipped. In some cases, the reading assistance module 240 may change the appearance of the words that have been skipped by highlighting the one or more words, flashing the one or more words, and the like. The reading assistance module 240 may also provide a visual or audio message stating that certain words have been skipped by the individual 210.

In addition, the reading assistance module 240 may provide reading assistance when the attention of the individual 210 is not focused on words of the electronic book 222. For example, in certain situations, the individual 210 may be viewing pictures of the electronic book 222 rather than the words of the electronic book 222. In other cases, the attention of the individual 210 may be focused on objects outside of the electronic book 222, such as people or objects in a room occupied by the individual 210. The reading assistance module 240 may determine that the attention of the individual 210 is focused outside of the electronic book 222 based on input received via the reading input module 230. In instances where the attention of the individual 210 is focused outside of the electronic book 222, the reading assistance module 240 may bring the attention of the individual 210 back to the words of the electronic book 222 by dimming the pictures being viewed by the individual 210 or flashing the words of the electronic book 222 where the individual left off reading. The reading assistance module 240 may also move words of the electronic book 222 to the portion of the electronic book 222 being viewed by the individual 210. To illustrate, the reading assistance module 240 may swap the pictures and words associated with a particular portion of the electronic book 222, such as a particular page of the electronic book 222, in order to focus the attention of the individual 210 back onto the words of the electronic book 222. The reading assistance module 240 may also provide an audio message or sounds to bring the attention of the individual 210 back to the words of the electronic book 222.

The memory 214 also includes a reading metrics module 242 that is executable by the processor 212 to determine metrics associated with individuals reading electronic books via the computing device 204. In particular instances, the reading metrics module 242 utilizes input received via the reading input module 230, such as voice input, gaze tracking input, touch input, and so on, to determine metrics related to the reading of the electronic books 222 by the individual 210 via the computing device 204. To illustrate, the reading metrics module 242 may determine that the individual 210 reads at a particular speed based on voice input, gaze tracking input, touch screen input, or a combination thereof, captured by the reading input module 230 with respect to the individual 210. The reading metrics module 242 may also determine an overall number of words read by the individual 210, a number of electronic books read by the individual 210, a number of new words read by the individual 210, such as words having a new reading level, and so on, based on the input gathered by the reading input module 230. The reading metrics module 242 may store the metrics in the data store 218 as the reading metrics 226. The reading metrics module 242 may also generate graphs, charts, other graphics, or combinations thereof, that indicate the metrics of the individual 210. In some cases, the graphs, charts, etc. may show the metrics of the individual 210 with respect to metrics of other individuals.

The reading metrics module 242 may also provide incentives to readers to improve the metrics, increase the amount of reading performed by the readers, increase the reading skills of readers, and the like. In a particular illustration, the reading metrics module 242 may indicate to the individual 210 that when the individual 210 has read a certain number of electronic books or a specified overall number of words, that the individual 210 may receive the ability to access particular content, such as a new electronic book, an electronic game, etc. The reading metrics module 242 may also indicate that the individual 210 may receive a coupon or gift certificate for a dessert or other food item at a restaurant or for merchandise at a particular store.

Additionally, the memory 214 includes a reader identifying module 244 that is executable by the processor 212 to identify a particular individual that is actually reading an electronic book via the computing device 204. In certain situations, a plurality of individuals may be in close proximity to the computing device 204 while an electronic book, such as the electronic book 222, is being read via the computing device 204. In an example provided previously, the individual 208 may represent a teacher or parent who is helping the individual 210, who is a student or child, read the electronic book 222 via the computing device 204. In order to determine voice input, gaze tracking input, or other types of input to consider when determining a portion of the electronic book 222 being read and to determine whether or not to provide reading assistance, the reader identifying module 244 may determine which of the individuals 208, 210 is actually reading the electronic book 222 via the computing device 204.

In some cases, the reader identifying module 244 may collect facial features, characteristics, and/or dimensions associated with the individuals 208, 210 via one or more cameras of the computing device 204. For example, the reader identifying module 244 may determine a length between the eyes of the individuals 208, 210, respective lengths of the faces of the individuals 208, 210, respective widths of the faces of the individuals 208, 210, other facial dimensions or facial characteristics of the individuals 208, 210, or a combination thereof. Based on the facial features and/or dimensions of the individuals 208, 210, the reader identifying module 244 may determine that the facial features of the individual 210 are more like the facial features and dimensions of a child's face and identify the individual 210 as the reader of the electronic book 222. The reader identifying module 244 may also utilize facial recognition techniques to determine that the individual 210 is a student or child, while the individual 208 is a teacher or parent.

Further, the reader identifying module 244 may determine a direction that voice input corresponding to words of the electronic book 222 is coming from and identify the individual 210 as the reader of the electronic book 222 based, at least in part, on the direction of the voice input. In certain instances, the reader identifying module 244 may also utilize voice characteristics, such as pitch, tone, volume, etc., to determine the reader of an electronic book. In a particular implementation, the reader identifying module 244 may determine that the voice characteristics of the individual 210 are more like those of a child and, thus, identify the individual 210 as the reader of the electronic book 222. In addition, the reader identifying module 244 may determine that the individual 210 is the reader of the electronic book 222 based, at least partly, on lip movement, eye movement, head movement, or a combination thereof, by the individual 210 and/or the individual 208. The reader identifying module 244 may also utilize triangulation techniques to identify a location of a reader of the electronic book 222.

Although not shown in FIG. 2, the service provider 202 may include computer readable storage media, such as volatile memory, nonvolatile memory, removable memory, non-removable memory, or a combination thereof. For example, the service provider 202 may include computer memory devices, such as RAM, ROM, EEPROM, flash memory, one or more hard disks, solid state drives, optical memory (e.g. CD, DVD), or other non-transient memory technologies, that store one or more modules with instructions that are executable by a processor to perform, in whole or in part, one or more operations performed by the computing device 204. For example, the service provider 202 may receive voice input, gaze tracking input, touch screen input, or a combination thereof, captured via input devices of the computing device 204. The service provider 202 may then utilize the input to determine a portion of an electronic book that an individual is viewing in a manner similar to that described with respect to the electronic book portion identification module 238.

The service provider 202 may also utilize the input to determine whether an individual needs assistance in reading one or more words of an electronic book in a manner similar to that described with respect to the reading assistance module 240. When the service provider 202 determines that an individual needs reading assistance, the service provider 202 may cause the computing device 204 to provide the reading assistance to the individual by sending particular instructions to the computing device 204.

Furthermore, the service provider 202 may perform operations similar to those of the reading metrics module 242 by generating metrics associated with the reading of one or more electronic books by one or more individuals. In certain cases, the service provider 202 may store at least a copy of the metrics in a data store associated with the service provider 202. The service provider 202 may also utilize voice input, gaze tracking input, and other forms of input to identify an individual who is actually reading an electronic book via the computing device 204 in a manner similar to that described with respect to the reader identifying module 244. In addition, the service provider 202 may also include modules that include instructions executable by a processor to perform operations complementary to operations performed by the computing device 204. To illustrate, the service provider 202 may provide at least a portion of an electronic book to be stored locally by the computing device 204 in response to a request for content of the electronic book received from the computing device 204.

Example User Interfaces

Figure 3:
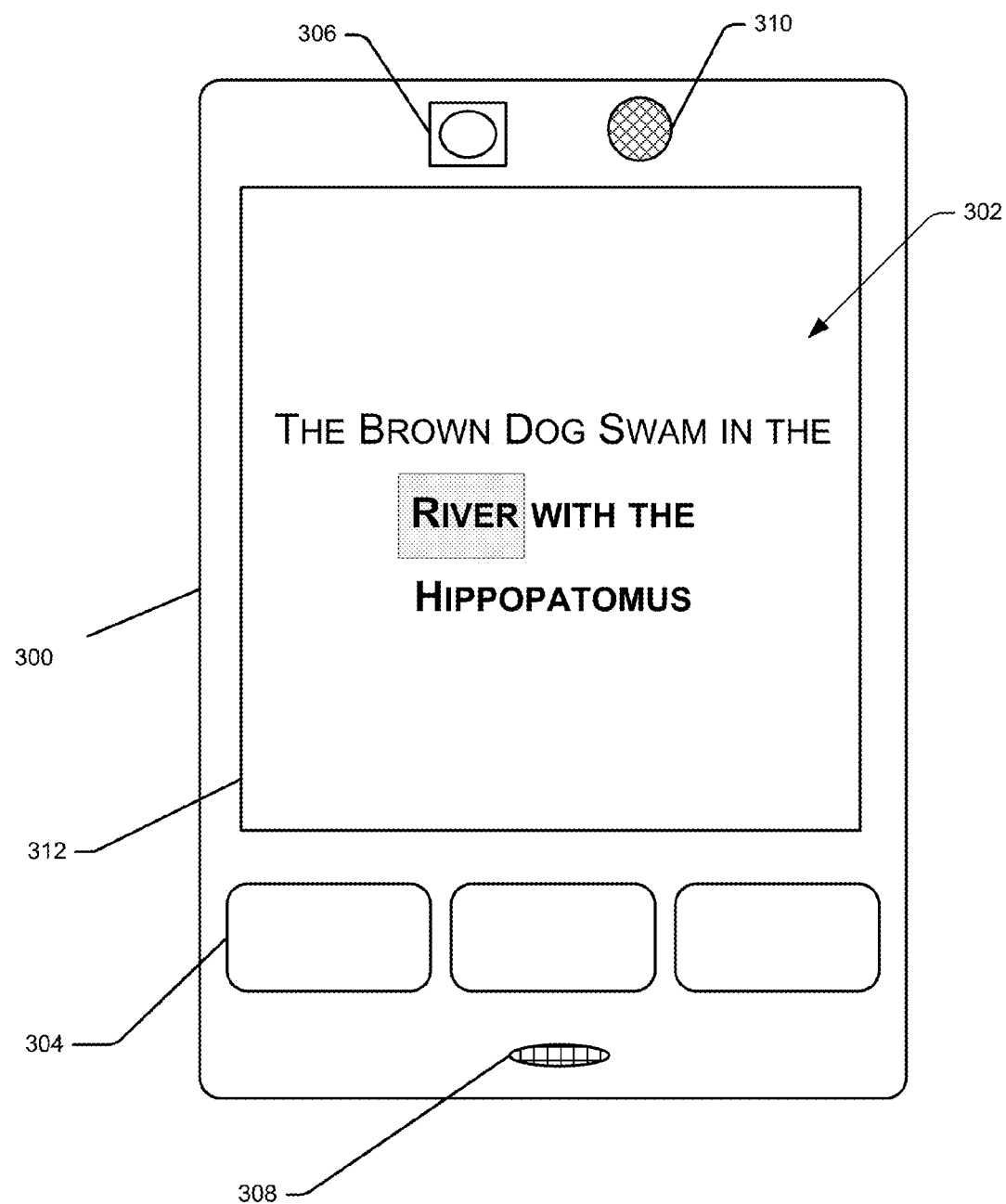
FIG. 3 shows a user interface to provide a reader with assistance to read a portion of an electronic book by changing the appearance of words that have been read and highlighting a next word to be read.

FIG. 3 illustrates a computing device 300 that displays a user interface 302 to provide a reader with assistance to read a portion of an electronic book by changing the appearance of words that have been read and highlighting a next word to be read. In some cases, the computing device 300 may correspond to the computing device 102 of FIG. 1 and the computing device 204 of FIG. 2 and perform operations similar to those performed by the computing devices 102, 204.

The computing device 300 includes a number of input devices 304 that are operable to type characters, make selections, and so forth. The computing device 300 also includes one or more cameras represented by camera 306, one or more microphones represented by microphone 308, and one or more speakers represented by speaker 310. Additionally, the computing device 300 includes a display 312 that may show electronic content of electronic books, such as the content shown in the user interface 302, which includes words of a particular electronic book. In some cases, the display 312 may include one or more touch sensitive regions, a touch screen, and the like.

As an individual reads the words of the user interface 302, the appearance of the words that have been read may change. In the illustrative example shown in FIG. 3, the words that have been read by the individual are displayed in a lighter color, while the words that have not been read are displayed in a darker color. In addition, the computing device 300 may determine one or more words of the electronic book that are to be read next by an individual based on voice input, gaze tracking input, touch input, or a combination thereof, and change the appearance of the next word(s) to be read. For example, as shown in FIG. 3, the word "river" has been highlighted to indicate that "river" is the next word to be read by an individual reading the electronic book shown in the user interface 302.

Figure 4:
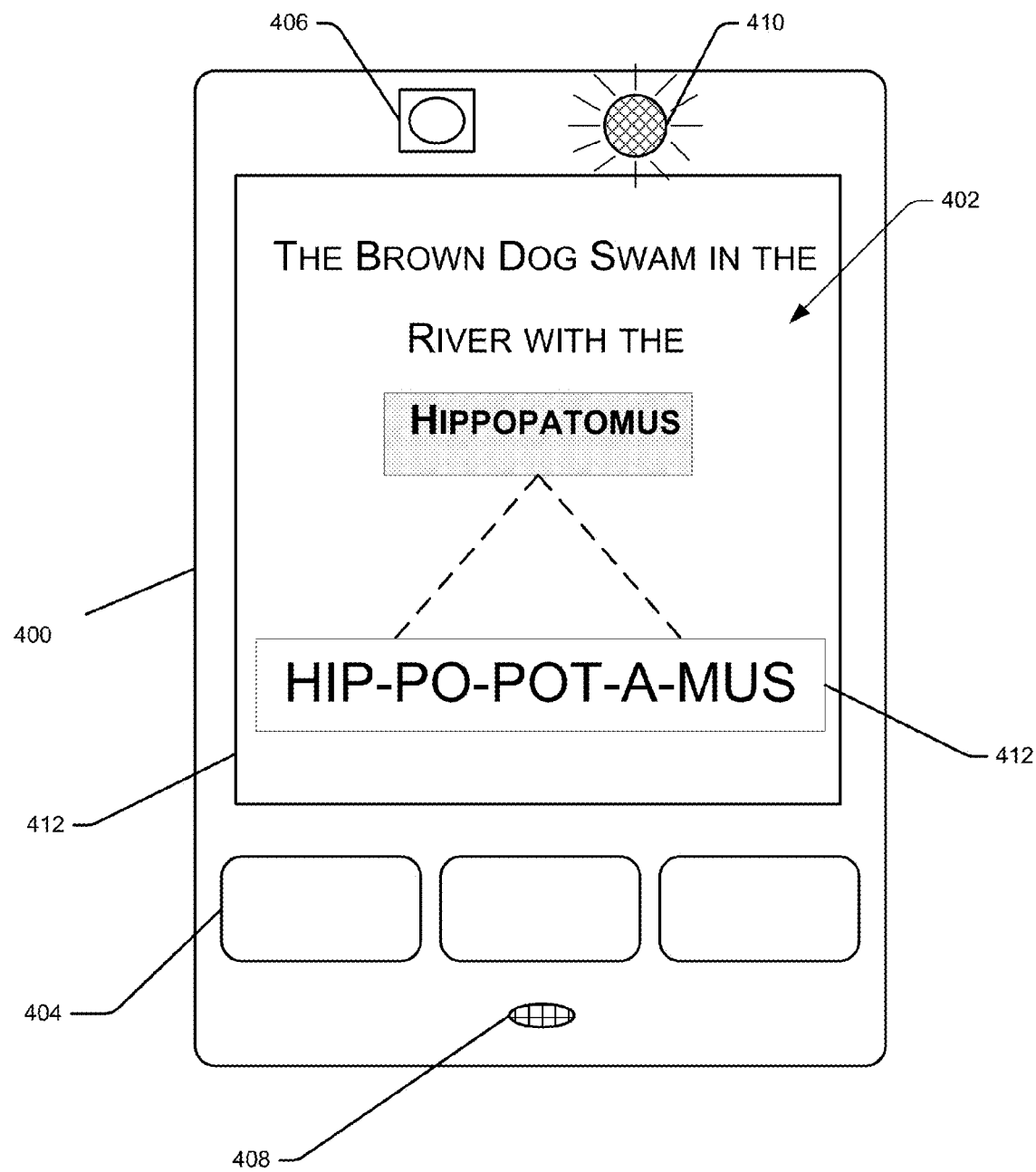
FIG. 4 shows a user interface to provide a reader with assistance to read a portion of an electronic book by displaying a phonetic spelling of a word.

FIG. 4 illustrates a computing device 400 that displays a user interface 402 to provide a reader with assistance to read a portion of an electronic book by displaying a phonetic spelling of a word. In some cases, the computing device 400 may correspond to the computing device 102 of FIG. 1 and the computing device 204 of FIG. 2 and perform operations similar to those performed by the computing devices 102, 204.

The computing device 400 includes a number of input devices 404 that are operable to type characters, make selections, and so forth. The computing device 400 also includes one or more cameras represented by camera 406, one or more microphones represented by microphone 408, and one or more speakers represented by speaker 410. Additionally, the computing device 400 includes a display 412 that may show electronic content of electronic books, such as the user interface 402, which includes words of a particular electronic book. In some cases, the display 410 may include one or more touch sensitive regions, a touch screen, and the like.

As an individual reads the words of the user interface 402, the appearance of the words that have been read may change. Furthermore, when the computing device 400 determines that an individual reading the particular electronic book needs assistance based on voice input, gaze tracking input, touch input, and so forth, the computing device 400 may provide visual and audible forms of assistance. For example, the computing device 400 may determine that an individual reading the words of the user interface 402 needs assistance in reading the word "hippopotamus" and generate a text box 412 that includes a phonetic spelling of the word "hippopotamus." The computing device 400 may also provide one or more audio recordings of "hippopotamus" to the individual via the speaker 410. The audio recordings of the "hippopotamus" may include a regular reading of the word, a reading of the word that emphasizes the phonemes of the word, or a combination thereof.

Figure 5:
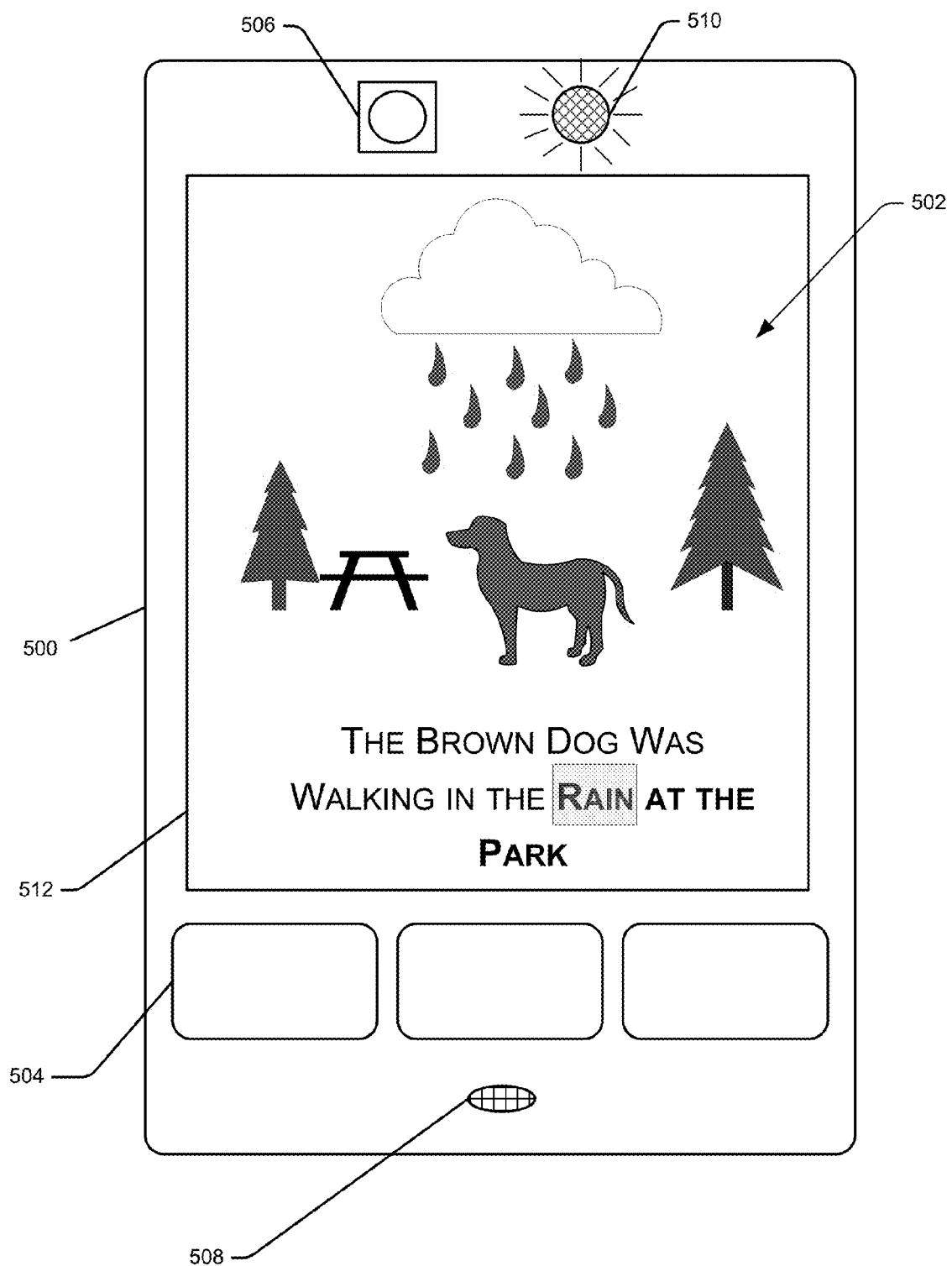
FIG. 5 shows a user interface to provide a reader with assistance to read a portion of an electronic book by changing the appearance of pictures corresponding to words that the individual needs assistance reading.

FIG. 5 illustrates a computing device 500 that displays a user interface 502 to provide a reader with assistance to read a portion of an electronic book by changing the appearance of pictures corresponding to words that the individual needs assistance reading. In some cases, the computing device 500 may correspond to the computing device 102 of FIG. 1 and the computing device 204 of FIG. 2 and perform operations similar to those performed by the computing devices 102, 204.

The computing device 500 includes a number of input devices 504 that are operable to type characters, make selections, and so forth. The computing device 500 also includes one or more cameras represented by camera 506, one or more microphones represented by microphone 508, and one or more speakers represented by the speaker 510. Additionally, the computing device 500 includes a display 512 that may show electronic content of electronic books, such as the user interface 502, which includes words, illustrations, and/or pictures of a particular electronic book. In some cases, the display 512 may include one or more touch sensitive regions, a touch screen, and the like.

As an individual reads the words of the user interface 502, the appearance of the words that have been read may change. Furthermore, when the computing device 500 determines that an individual reading the particular electronic book needs assistance based on voice input, gaze tracking input, touch input, and so forth, the computing device 500 may provide visual and audible forms of assistance. For example, the computing device 500 may determine that an individual reading the words of the user interface 502 needs assistance in reading the word "rain" and change the appearance of the rain illustrated in the user interface 502 to help the reader make the connection between the word they are having trouble reading and the illustration of rain shown in the user interface 502. In some cases, the computing device 500 may brighten the color of the raindrops or initiate an animation sequence showing the rain drops falling in order to assist the individual in reading the word "rain." The computing device 500 may also provide one or more audio recordings of "rain" to the individual via the speaker 510. The audio recordings may include a regular reading of the word "rain," the sound of rain falling, or a combination thereof.

In certain situations, even when the individual does not need assistance in reading the words shown on the user interface 502, the computing device 500 may change the appearance of illustrations shown on the user interface 502 as the individual reads the words. To illustrate, as the individual reads the words "brown dog," the brown dog shown in the user interface 502 may have its appearance altered. Additionally, when the individual reads the word "walking," the computing device 500 may initiate an animation that shows the dog of the user interface 502 walking.

Example Processes

Figure 6:
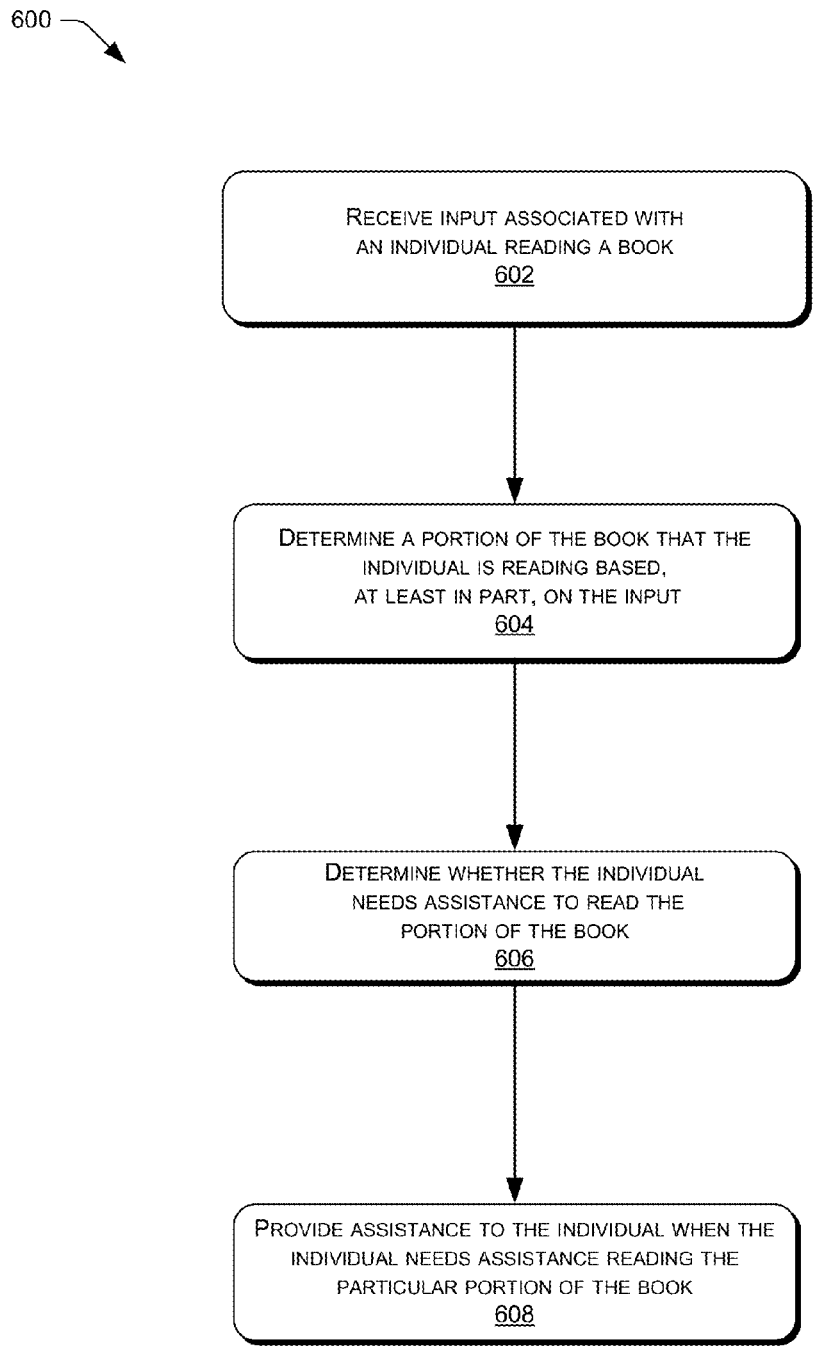
FIG. 6 is a flow diagram of a process to provide reading assistance to an individual.
Figure 7:
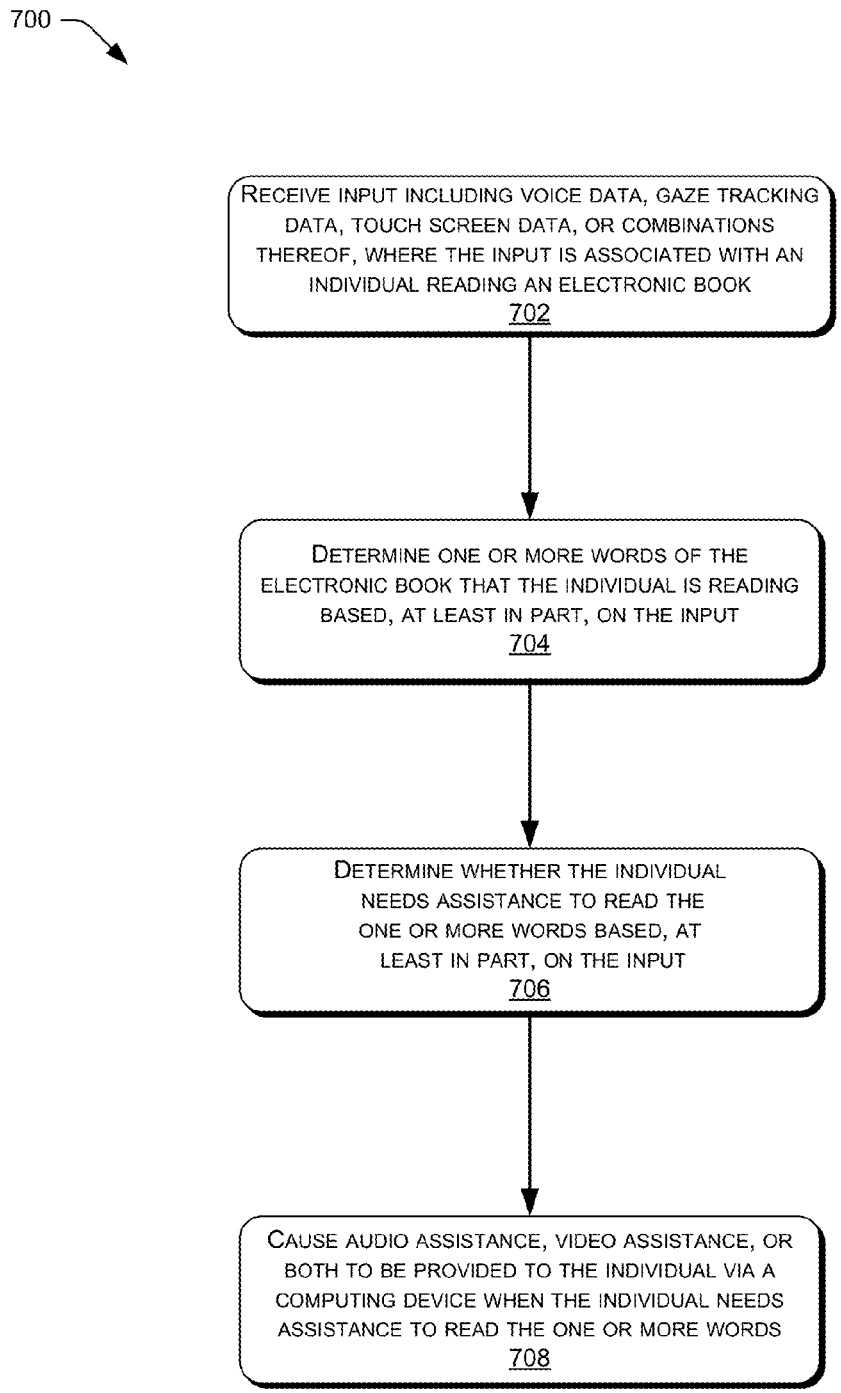
FIG. 7 is a flow diagram of a process to determine a portion of an electronic book that an individual is viewing at a particular time and to provide assistance to the individual based on the portion of the electronic book that the individual is viewing.
Figure 8:
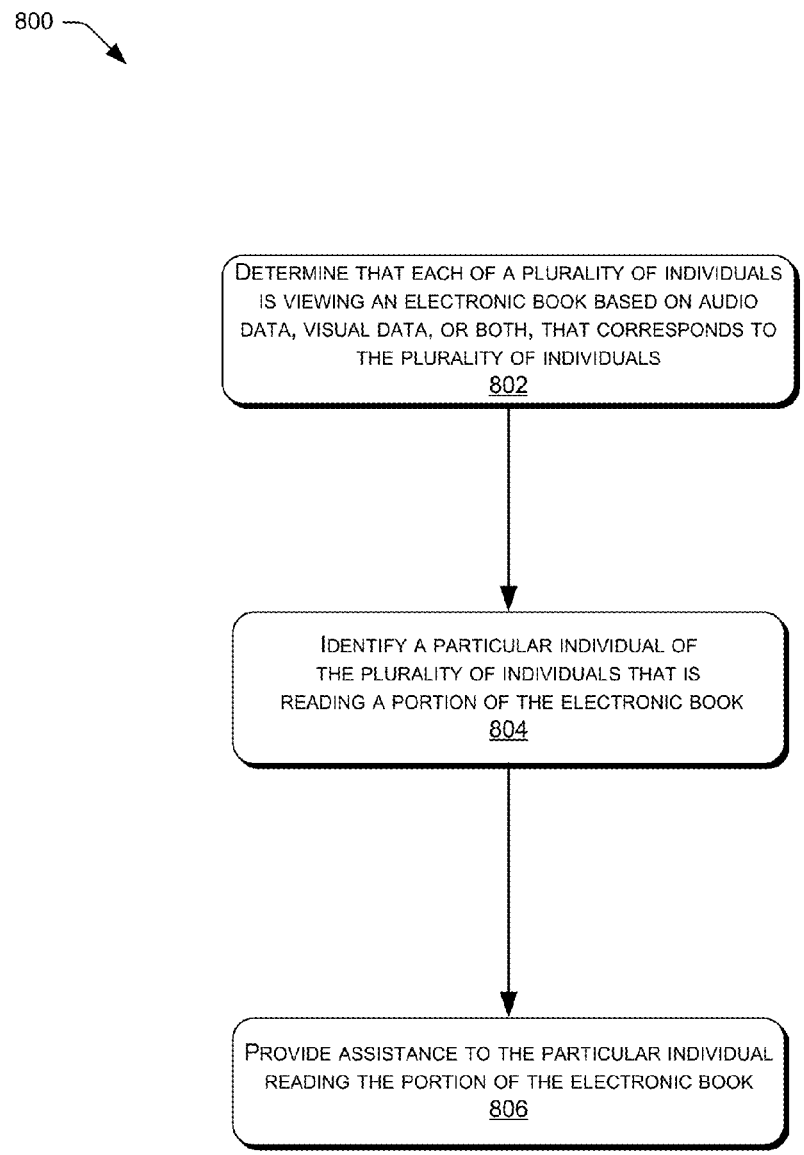
FIG. 8 is a flow diagram of a process to determine an individual that is reading an electronic book and provide assistance to the individual to read a portion of the electronic book.

FIGS. 6-8 show processes 600-800 respectively, to provide assistance to individuals reading electronic books. The processes 600-800 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The operations described in FIGS. 6-8 may be performed by one or more of the components shown in FIGS. 1-5, such as the computing devices 102, 204, 300, 400, 500, servers and other computing devices of the service provider 202, other computing devices, or a combination thereof.

FIG. 6 is a flow diagram of a process 600 to provide reading assistance to an individual. At 602, the process 600 includes receiving input associated with an individual reading content, where the input may be captured by a particular computing device. In certain scenarios, the content may be an electronic book including content that is shown via a display device of the particular computing device. The content may also include content accessed by a browser application or other content viewing application of the particular computing device, such as content of one or more sites. Further, the content may include an electronic book that is visible independent from the particular computing device, such as via a separate computing device. In other scenarios, the content may be physical content, such as a book, magazine, journal, newspaper, and so forth. In any case, the particular computing device includes input devices, such as microphones, cameras, and so forth to capture input as the individual reads the content.

The input captured via the particular computing device may include voice input associated with the individual reading the content aloud. The input captured via the particular computing device may also include visual data including eye movements, lip movements, head movements, and the like, that are made by the individual while reading the content. Further, when the content being read by the individual is an electronic book, the input may include touch input captured by a touch screen of the particular computing device.

At 604, the process 600 includes determining a portion of the content that the individual is reading, based at least in part, on the input received. To illustrate, the particular computing device may compare input indicating words being read by the individual to the actual words of the content to determine the portion of the content that the individual is reading. Additionally, the particular computing device may utilize gaze tracking techniques to determine a portion of the content that the individual is viewing to determine the portion of the content that the individual is reading.

At 606, the process 600 includes determining whether the individual needs assistance to read the portion of the content that the individual is reading. For example, the particular computing device may determine whether the individual has paused for a certain length of time while reading the content or determine whether the individual has mispronounced one or more words of the content a specified number of times.

When the individual needs assistance reading the particular portion of the content, the particular computing device may provide assistance to the individual to read the portion of the content at 608. In some cases, the computing device may play an audio recording of one or more words of the content that the individual needs help reading. When the content is an electronic book displayed via the particular computing device, the computing device may highlight one or more words of the electronic book that the individual needs assistance in reading and/or provide a portion of a display showing a phonetic spelling of the one or more words that the individual needs assistance reading. Further, the computing device may assist the individual in reading certain words of the electronic book by changing an appearance of one or more pictures of the electronic book that correspond to the one or more words of the electronic book that the individual assistance in reading.

FIG. 7 is a flow diagram of a process 700 to determine a portion of an electronic book that an individual is viewing at a particular time and to provide assistance to the individual based on the portion of the electronic book that the individual is viewing. At 702, the process 700 includes receiving input including voice data, gaze tracking data, touch screen data, or combinations thereof, that are associated with an individual reading an electronic book. In some cases, the input may be received from input devices of a computing device. In other implementations, the input may be received at a server of a service provider from a computing device that has captured the input.

At 704, the process 700 includes determining one or more words of the electronic book that the individual is reading, at least partly, based on the input. At 706, the process 700 includes determining whether the individual needs assistance to read the one or more words, based at least partly, on the input. For example, while an individual is reading the electronic book, the individual may pause when viewing an unfamiliar word or a word that the individual does not know how to read. In some cases, the individual may eventually be able to read the word, but in other cases, the individual may need assistance to read the word. Thus, when the individual pauses while reading one or more words of the electronic book, a computing device of the individual or a server of a service provider may determine a length of the pause and determine that the individual needs assistance in reading the one or more words when the length of the pause is greater than a threshold length. The computing device of the individual or the server of the service provider may also determine that the individual needs assistance to read the one or more words based on a specified number of mispronunciations of the one or more words captured by the computing device of the individual.

At 708, the process 700 includes causing audio assistance, video assistance, or both to be provided to the individual via the computing device of the individual when the individual needs assistance to read the one or more words. In some situations, the computing device of the individual may initiate an audio recording of the one or more words and/or initiate the display of a phonetic spelling of the one or more words. In other situations, the computing device may receive instructions from a server of a service provider to play the audio recording of the one or more words or show the display of the phonetic spelling.

FIG. 8 is a flow diagram of a process 800 to determine an individual that is reading an electronic book and provide assistance to the individual to read a portion of the electronic book. At 802, the process 800 includes determining that each of a plurality of individuals is viewing an electronic book based on audio data, visual data, or both, that correspond to the plurality of individuals. For example, a computing device may receive audio input from a number of individuals proximate to the computing device, such as voice input from a child or student reading an electronic book and voice input from a parent or teacher helping the child or student to read the electronic book. Cameras of the computing device may also capture facial features and characteristics of the individuals proximate to the computing device who are reading the electronic book, reading along with a particular individual reading the electronic book, or helping the particular individual to read the electronic book.

At 804, the process 800 includes identifying a particular individual of the plurality of individuals that is reading the portion of the electronic book. To illustrate, based on the audio data and/or visual data captured by the computing device, the computing device may identify the individual that is actually reading the electronic book. In some cases, the computing device may analyze facial characteristics of the individuals to determine whether one of the plurality of individuals has the facial characteristics of a child and determine that an individual with facial characteristics of a child is likely to be the reader of the electronic book requiring assistance. The computing device may also utilize facial recognition techniques to identify a child or student that may be associated with reading the electronic book and possibly requiring assistance to read the electronic book. Further, the computing device may utilize lip movements, eye movements, head movements, and so forth to identify the individual actually reading the electronic book. The computing device may also analyze voice characteristics, such as tone, pitch, and volume, and/or voice direction to identify the reader of the electronic book.

At 806, the process 800 includes providing assistance to the particular individual reading the portion of the electronic book. In particular implementations, the computing device may then determine a portion of the electronic book that the individual is viewing based on gaze tracking data, voice data, touch screen data, or a combination thereof. The computing device may also determine, based on the gaze tracking data, audio data, touch screen data, or a combination thereof, that the reader of the electronic book needs assistance in reading the portion of the electronic book and provide assistance to the individual to read the portion of the electronic book.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   under control of a computing device configured with specific instructions executable by one or more processors of the computing device,
   receiving, by a reading input module of the computing device, voice input data from a microphone including words of an electronic book displayed via a display of the computing device, the words being spoken by an individual reading the electronic book;
   receiving, by the reading input module of the computing device, eye movement data from a gaze tracking camera;
   assigning a first weight to the voice input data and a second weight to the eye movement data;
   determining, based at least in part on the first weight and the second weight, that the individual has skipped one or more words while reading the portion of the electronic book; and
   causing, by the computing device, visual assistance to be provided to assist the individual in reading the portion of the electronic book, wherein the visual assistance includes changing an appearance of the one or more words skipped by the individual.

2. The computer-implemented method of claim 1, further comprising:
   determining a learning type of the individual; and
   wherein causing the visual assistance to be provided to assist the individual in reading the portion of the electronic book is based, at least in part, on the learning type of the individual.

3. The computer-implemented method of claim 1, further comprising determining, based at least in part on the voice input data, that the individual pauses while reading a portion of the electronic book, and determining a length of a pause taken by the individual while reading the portion of the electronic book.

4. The computer-implemented method of claim 3, wherein the causing of the visual assistance to be provided occurs at least partly in response to the length of the pause reaching a threshold length.

5. The computer-implemented method of claim 4, wherein the threshold length of the pause is based, at least in part, on a reading level of one or more words of the portion of the electronic book.

6. The computer-implemented method of claim 1, wherein the causing of the visual assistance to be provided is based, at least in part, on reading ability of the individual.

7. The computer-implemented method of claim 1, further comprising determining that the individual is viewing the portion of the electronic book based, at least in part, on touch screen data indicating selection of a word of the portion of the electronic book.

8. The computer-implemented method of claim 1, further comprising:
   collecting respective voice data, respective gaze tracking data, or both, while the individual reads each of a plurality of electronic books; and
   determining metrics associated with the individual reading the plurality of electronic books based, at least in part, on the respective voice data, the respective gaze tracking data, or both.

9. The computer-implemented method of claim 8, wherein the metrics include reading speed, reading ability of the individual, reading level of words read by the individual, a number of words read, a number of new words read, or combinations thereof.

10. The computer-implemented method of claim 8, further comprising providing incentives to the individual to improve the metrics.

11. The computer-implemented method of claim 8, further comprising generating a user interface including graphs, charts, other graphics, or combinations thereof, indicating the metrics.

12. The computer-implemented method of claim 1, further comprising:
turning a page of the electronic book in response to determining that the individual has read at least one last word of the page of the electronic book.

13. A computing device comprising:
a processor;
a camera;
a display; and
memory accessible by the processor, the memory storing one or more modules executable by the processor to:
detect, using the camera, that there are multiple individuals viewing the display of the computing device;
determine which individual, of the multiple individuals, is reading the electronic book based, at least in part, on lip movement, eye movement, head movement, or a combination thereof, that is captured by the camera;
determine a portion of content being viewed by the individual reading the electronic book;
receive input data indicating words read by the individual reading the electronic book;
alter an appearance of at least one word of the words read by the individual reading the electronic book;
perform a comparison of the words read by the individual reading the electronic book with words of the portion of the content being viewed by the individual reading the electronic book;
determine, based at least in part on the comparison, that the individual reading the electronic book skipped one or more words of the portion of the content being viewed by the individual reading the electronic book; and
provide assistance to read the one or more words skipped by the individual reading the electronic book.

14. The computing device of claim 13, wherein the portion of the content that is being viewed by the individual reading the electronic book is a particular portion of an electronic book, and wherein the memory further includes at least one module executable by the processor to provide portions of the electronic book via a display device.

15. The computing device of claim 14, wherein the one or more modules are further executable by the processor to provide assistance to read the portions of the electronic book by highlighting a word of the electronic book.

16. The computing device of claim 14, wherein the one or more modules are further executable by the processor to provide assistance to read the portions of the electronic book by displaying phonemes of a word of the electronic book.

17. The computing device of claim 14, wherein the one or more modules are further executable by the processor to provide assistance to read the portions of the electronic book by dimming or brightening pictures proximate to a word included in the portions of the electronic book.

18. The computing device of claim 14, wherein the one or more modules are further executable by the processor to:
determine that the individual reading the electronic book is viewing a first portion of the electronic book that includes a picture, and
provide additional assistance to read a word of a second portion of the electronic book by moving the word from the second portion of the electronic book to the first portion of the electronic book.

19. The computing device of claim 14, wherein the one or more modules are further executable by the processor to determine at least one next word of the electronic book to be read by the individual reading the electronic book and to alter an appearance of the at least one next word.

20. The computing device of claim 19, wherein altering the appearance of the at least one next word includes changing a color, font, or style of the at least one next word, highlighting the at least one next word, increasing a size of the at least one next word, or combinations thereof.

21. The computing device of claim 14, wherein the one or more modules are further executable by the processor to provide assistance to read the portions of the electronic book by changing an appearance of one or more pictures of the electronic book that correspond to at least one word read by the individual reading the electronic book.

22. The computing device of claim 13, wherein providing the assistance to read the one or more words skipped by the individual reading the electronic book includes altering an appearance of the one or more words.

23. The computing device of claim 13, wherein the one or more modules are further executable by the processor to:
provide additional assistance to read portions of the content at least partly in response to determining that the individual reading the electronic book has made a specified number of unsuccessful attempts to pronounce a word.

24. A non-transitory computer-readable media storing computer-readable instructions that, when executed, instruct a processor to perform operations comprising:
determining that each of a plurality of individuals is viewing an electronic book based, at least in part, on audio data captured by a microphone, visual data captured by a gaze tracking camera, or both that corresponds to the plurality of individuals;
identifying, based, at least in part, on lip movement, eye movement, head movement, or a combination thereof, that is captured by the gaze tracking camera, an individual of the plurality of individuals that is reading a portion of the electronic book being viewed by the individual;
identifying, based at least in part on output of a gaze tracking camera, the portion of the electronic book that the individual is viewing;
determining, based at least in part on output of the gaze tracking camera, that the individual pauses reading for a period of time while viewing the portion of the electronic book; and
providing assistance to pronounce one or more words of the portion of the electronic book.

25. The non-transitory computer readable media of claim 24, wherein the operations further comprise determining facial characteristics of each of the plurality of individuals, and the individual reading the portion of the electronic book is identified based, at least in part, on the facial characteristics of the plurality of individuals.

26. The non-transitory computer-readable media of claim 25, wherein the facial characteristics include distance between eyes, length of face, width of face, other facial dimensions, or combinations thereof.

27. The non-transitory computer-readable media of claim 24, wherein the operations further comprise determining a direction of a voice reading words of the portion of the electronic book, and wherein the individual reading the portion of the electronic book is identified based, at least in part, on the direction of the voice.

28. The non-transitory computer-readable media of claim 24, wherein the individual reading the portion of the electronic book is identified based, at least in part, on characteristics of voices of the plurality of individuals, the characteristics of the voices of the plurality of individuals including tone, pitch, volume, or combinations thereof.

29. The non-transitory computer-readable media of claim 24, wherein the operations further comprise determining an identity of each of the plurality of individuals via facial recognition techniques, and wherein the individual reading the portion of the electronic book is identified based, at least in part, on the identity of each of the plurality of individuals.

30. The non-transitory computer-readable media of claim 24, wherein the individual reading the portion of the electronic book is identified based, at least in part, on lip movements, eye movements, head movements, or combinations thereof, by one or more of the plurality of individuals.

31. The computer-implemented method of claim 1, further comprising:
   determining that the individual has read the portion of the electronic book; and
   based at least in part on the determining, causing the visual assistance to be removed by returning the appearance of the one or more words to a prior appearance used to present the one or more words before the visual assistance changed the appearance of the one or more words.

* * * * *